3,280,137
QUATERNARY AMMONIUM MENAPHTHYL
SACCHARINATES
Reginald L. Wakeman, Philadelphia, Pa., and Joseph F. Coates, Washington, D.C., assignors, by mesne assignments, to Millmaster Onyx Corporation, New York, N.Y., a corporation of Delaware
No Drawing. Filed Apr. 13, 1964, Ser. No. 359,427
1 Claim. (Cl. 260—301)

The present invention has for its object the preparation of microbiologically active compounds by reaction of certain quaternary ammonium hydroxides or their water-soluble salts possessing exceptionally high microbiological activity with o-sulfobenzoic imide, commonly known as saccharin, or its water-soluble salts.

The quaternary ammonium compounds used in the process of this invention are all bacteriologically active, having a phenol coefficient of at least 550 with respect to both *Staphylococcus aureus* and *Salmonella typhosa* at 20° C. when determined by the standard method given in the United States Department of Agriculture Circular No. 198. They contain a long alkyl group having from 10 to 16 carbon atoms and a benzyl group substituted by mono or divalent hydrocarbon radicals containing a total of from 1 to 5 carbon atoms, both of said long alkyl and substituted benzyl groups being attached to the quaternary nitrogen atom. The quaternary ammonium compounds, moreover, possess only non-heterocyclic nitrogen atoms. In general, the quaternary ammonium compounds used in the present invention comply with the formula:

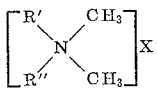

where R′ is an alkyl radical containing from 10 to 16 carbon atoms and R″ is a substituted benzyl radical. X in the above formula is chlorine, bromine, iodine, sulfate, methosulfate, ethosulfate and the like.

Typical examples of these quaternary ammonium compounds are alkyl dimethyl substituted benzyl ammonium chlorides in which the alkyl group contains from 10 to 16 cabron atoms and in which the benzyl radical is substituted with one or more side chains containing from 1 to 5 carbon atoms such, for example, as methyl, dimethyl, trimethyl, tetramethyl, ethyl, diethyl, isopropyl, tertiary butyl and isoamyl; alkyl dimethyl menaphthyl ammonium chloride and alkyl dimethyl tetrahydromenaphthyl ammonium chloride in which the alkyl radical contains from 10 to 16 carbon atoms, and mixtures of the aforesaid quaternary ammonium compounds.

The compounds of this invention may be prepared by mixing an aqueous solution of the quaternary ammonium salt or hydroxide of the kind defined above with an aqueous solution of the saccharin or with any of its water-soluble salts.

After thorough mixing, the organic product layer is separated from the aqueous layer (as with a separatory funnel) since two distinct phases are formed. Separation may be facilitated by the addition of an organic solvent immiscible with water. The product layer may be washed with water to remove any residual by-product salt or unreacted materials. The solvent, if any, may be evaporated and the product air or vacuum dried to a paste, wax, oil or solid.

It is not necessary to use an aqueous medium. Any solvent or solvent mixture in which the starting materials are soluble will be satisfactory. Non-aqueous solvents facilitate the separation of by-product inorganic salt and reduce the need for vacuum drying to get an anhydrous product. When a non-aqueous medium is employed, it is usually necessary to add a small amount of water to facilitate ionic reaction.

The product may be used, if desired, without drying since any entrapped water is irrelevant to the microbiological activity of the compounds. In other applications, removal of water may be essential for reasons not related to biological activity.

An alternative method for the preparation of compounds especially applicable to the treatment of fabric, ropes, net, woven and non-woven fabric and reticulated or convoluted materials, involves a two-step process. In the first step, the material is passed through a bath containing the anionic moiety. Excess solution is removed by methods well known to those skilled in the art. The treated material is then passed through a second bath wherein the concentration of quaternary ammonium compound is such that the material pickup will result in an equivalent amount of quaternary ammonium compound reacting with the anionic moiety, depositing the product in the most intimate way on the surface and in the interstices, convolutions and reticulations of the material.

The method of adjustment of solution concentration to achieve the required pickup is well known to those skilled in the art. The order of treatment may be reversed without affecting the biological activity or durability of the product on the material. The products of this invention may be formulated as water dispersions by dissolving them in a water-miscible organic solvent such as acetone or methanol and diluting with water or by dissolving them in emulsifiable oils, such, for example, as sulfonated castor oil or pine oil and diluting with water. In preparing aqueous dispersions, emulsifying agents such, for example, as ethylene oxide condensates of alkyl phenols may be used with or without organic solvents.

It is surprising that the compounds of this invention exhibit high microbiological activity despite their relative insolubility in water. Because of their unusual combination of physical and microbiological properties, they can be used to impart laundry-resistant anti-microbial characteristics to textiles. They can also be used as the active agent in antimildew finishes for textiles which are resistant to leaching with water.

Although the compounds have low water solubility, they are compatible with various organic solvents, plasticizers and high molecular weight compounds. Consequently, they may be incorporated as anti-microbial agents in synthetic resins and plastics. The compounds are compatible with natural and synthetic rubber latices. Therefore, they may be used to prepare bacteriostatic films and molded objects deposited from such latices.

The compounds can be incorporated into cutting and grinding fluids without precipitation. Also, they blend well with non-ionic and anionic surface active agents. In such compositions they retain their microbiological activity.

It will be understood that the properties of the products described herein will vary depending upon the nature of the quaternary ammonium compound used in their preparation.

The chemical, physical and biological properties of the products of our invention make them especially appropriate for the following applications when suitably incorporated in active amounts in an appropriate vehicle, binder, medium or substrate:

(1) Mildewproofing fabric, canvas, ropes, textiles, awnings, sails, tenting and other woven and non-woven reticulated materials.

(2) Paint mildewstats.

(3) Jet plane fuel additive to control growth of microorganisms.

(4) Odor preservative agents for clothes and shoes.
(5) Mildew retardant and odor suppressant for shoes and other leather products.
(6) Topical aniseptics.
(7) Antidandruff agents.
(8) Disinfection agents for hair and gut of man and beast.
(9) Bacteriostatic furniture dressing.
(10) Surface furnishes for stone, plaster, tile, cement, brick and other inorganic building materials to retard growth of microorganisms, fungi, mold and algae.
(11) Wool preservative.
(12) Plant and tree spray to combat fungi.
(13) Antimycotic agents for soap wrappers.
(14) Self-sanitizing brushes.
(15) Mildewproofing agent in and on plastic and film.
(16) Mildewproofing of cellulosics, cardboard, fibreboard, paper and cordage.
(17) Contact biostat for application of film, waxes and cloth to preserve cheese, meats and vegetables and other food products.
(18) Algal inhibition, especially on surfaces and in solution where low foaming is desirable.
(19) Paper pulp slime control.
(20) Sanitizing agent for rug, carpet, curtains.
(21) Egg preservation.
(22) Adhesive preservation.
(23) Preservation of latex paints.
(24) Preservation of metal-working compounds.
(25) Additives for soap and for both anionic and nonionic detergents in liquid, bar, powder, bead, solution and other forms to impart bacteriostatic and fungistatic properties thereto.

The microbiological activity of our compounds has been evaluated for microbiological stasis by the Standard Tube Dilution Test, the technique for which is common knowledge to those skilled in the art. A Difco Bacto CSMA Broth #0826 was used in the study. This test is used to determine the lowest concentration of microbiologically active compounds which will inhibit the growth of the organism in question. For a wide range of applications, the inhibition of growth rather than outright kill is satisfactory.

Briefly put, the Tube Dilution Test consists in placing 9 cc. of the CSMA Broth in a test tube which is then sterilized in an autoclave. One cc. solution of the microbiologically active compound at an appropriate concentration is added to the test tube which is then inoculated with 0.1 cc. of a twenty-four hour old culture of the organism under study. The test tube is then incubated at 37° C. for forty-eight hours and observed for bacterial growth.

The same procedure is followed for fungi. In such tests, however, the tubes are incubated for fourteen days at a temperature suitable for optimum fungal growth, usually 25° C.

The invention is illustrated by, but not restricted to, the following examples:

EXAMPLE I

A stock solution of the sodium salt of o-sulfobenzoic imide was prepared in 10% concentration. An aliquot of this solution containing 0.232 equivalent weights of the compound was agitated vigorously while adding the chemically equivalent amount of a solution in aqueous isopropyl alcohol of a commercial grade of alkyl dimethyl menaphthyl ammonium chloride (Onyx Chemical Corporation's "BTC–1100" in which the alkyl distribution is 98% $C_{12}$ and 2% $C_{14}$).

The mixture was heated to remove the isopropyl alcohol by evaporation, whereupon an oily layer separated. The whole was transferred to a separatory funnel and the organic product phase was removed and vacuum dried. A yellow paste of alkyl dimethyl menaphthyl ammonium saccharinate was obtained in 92% of the theoretical yield.

The microbiological activity of this product when determined by the Standard Tube Dilution Test described above is as follows:

| | Reciprocal of static dilution of product |
|---|---|
| Staphylococcus aureus | $10^7$ |
| Salmonella typhosa | $10^7$ |
| Aspergillus niger | $>10^6$ |

EXAMPLE II

An aliquot of the solution of the sodium salt of o-sulfobenzoic imide of Example I containing 0.135 equivalent weights of the compound was agitated vigorously while adding the chemically equivalent amount of an aqueous solution of a commercial grade of alkyl dimethyl ethyl-benzyl ammonium chloride (Onyx Chemical Corporation's "BTC–471" in which the alkyl distribution is 50% $C_{12}$, 30% $C_{14}$, 17% $C_{16}$, 3% $C_{18}$). A small amount of benzene was added to facilitate phase separation. The mixture was poured into a separatory funnel and two layers formed. The organic product layer was removed and vacuum dried to yield 70.5 g. of a clear glassy mass of alkyl dimethyl ethyl-benzyl ammonium saccharinate in 95% of the theoretical yield.

The microbiological activity of this product when determined by the Standard Tube Dilution Test described above is as follow:

| | Reciprocal of static dilution of product |
|---|---|
| Staphylococcus aureus | $10^6$ |
| Salmonella typhosa | $10^5$ |
| Aspergillus niger | $>10^3$ |

EXAMPLE III

In the same manner as in Example II, a solution of a commercial grade of alkyl dimethyl dimethyl-benzyl ammonium chloride (Onyx Chemical Corporation's "BTC–927" in which the alkyl distribution is 50% $C_{12}$, 30% $C_{14}$, 17% $C_{16}$, 3% $C_{18}$) was used in place of the alkyl dimethyl ethyl-benzyl ammonium chloride. Alkyl dimethyl dimethyl-benzyl amomnium saccharinate was obtained, upon vacuum drying the product layer, as a white solid in almost the theoretical yield.

The products of this invention are particularly useful in the control of plant viruses such, for example, as the southern bean mosaic virus against which they exhibit excellent activity without showing phytotoxic characteristics with respect to such plants as the Pinto bean when applied by either dip or spray at concentrations as high as 2000 parts per million. They are also effective against *Ceratocystis ulmi*, the pathogen responsible for Dutch elm disease. Thus, for instance, the product of Example I shows biocidal activity against this fungus, by in vitro tests at concentrations as low as 100 parts per million. The products of this invention, specifically that of Example II, are excellent algicides for the control of blue green algae when also used at concentrations as low as 100 parts per million. They are also useful bacteriostats, fungistats and algistats in the treatment of industrial cooling water and in secondary oil recovery.

We claim:
Alkyl dimethyl menaphthyl ammonium saccharinate wherein the alkyl has 10 to 16 carbon atoms.

References Cited by the Examiner
UNITED STATES PATENTS
3,133,072    5/1964    Shibe et al. _____ 260—301

OTHER REFERENCES
Onyx Industrial Chemicals Bulletin, October 1964.
The Condensed Chemical Dictionary, sixth edition (New York, 1961), page 176.

ALEX MAZEL, *Primary Examiner.*
NICHOLAS S. RIZZO, *Examiner.*
A. D. ROLLINS, *Assistant Examiner.*